United States Patent [19]

Nolen, Jr. et al.

[11] 4,017,164
[45] Apr. 12, 1977

[54] HIGH POWER LASER APODIZER

[75] Inventors: Robert L. Nolen, Jr.; Larry D. Siebert, both of Ann Arbor, Mich.

[73] Assignee: KMS Fusion, Inc., Ann Arbor, Mich.

[22] Filed: Oct. 9, 1974

[21] Appl. No.: 513,340

[52] U.S. Cl. .............................. 350/312; 252/300; 350/3; 350/162 R; 350/205

[51] Int. Cl.[2] ......................................... G02B 5/24

[58] Field of Search ............ 350/3, 205, 179, 267, 350/312, 162 R; 252/300

[56] References Cited

UNITED STATES PATENTS

| | | | |
|---|---|---|---|
| 1,666,047 | 4/1928 | Jones et al. ............................ | 350/3 |
| 2,481,660 | 9/1949 | Harrison ............................ | 350/267 |
| 3,867,017 | 2/1975 | Bliss et al. ............................ | 350/179 |

OTHER PUBLICATIONS

"Dimethyl Sulfoxide Technical Bulletin", Crown Zellerbach Corp., Camas, Washington, May, 1964.

*Primary Examiner*—Ronald J. Stern
*Attorney, Agent, or Firm*—Barnes, Kisselle, Raisch & Choate

[57] ABSTRACT

A non-bleachable liquid absorber for high power laser apodizers which utilizes an annular liquid chamber filled with a dye solution composed of copper nitrate in dimethyl sulfoxide and water.

2 Claims, 1 Drawing Figure

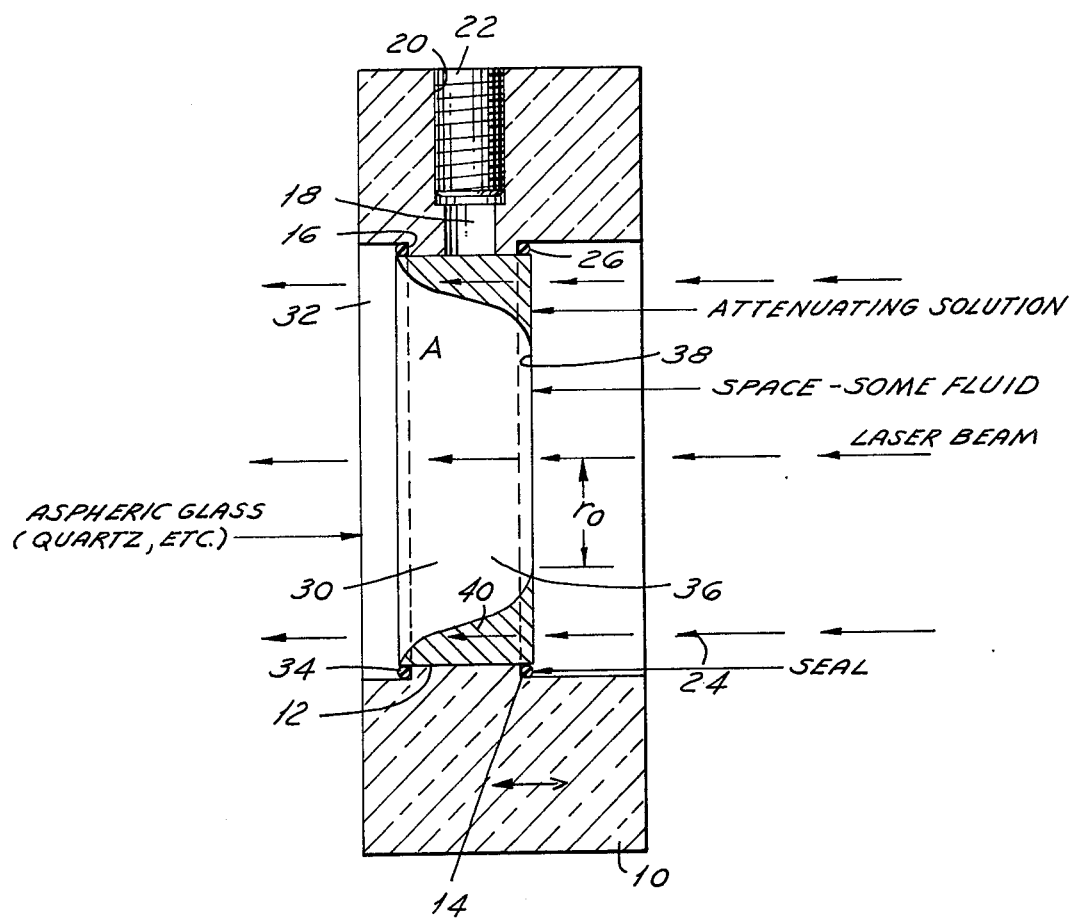

HIGH POWER LASER APODIZER

This invention relates to a High Power Laser Apodizer.

It is an object of the invention to provide a non-bleachable liquid absorber for high power laser apodizers. It is known to use a bleachable organic dye in chlorobenzene and also to use copper sulfate ($CuSO_4$) as a high power attenuator. These products, however, have not proved satisfactory since they tend to provide inconsistent results because of the change effected by the exposure to laser energy.

It is, therefore, an object of the present invention to provide a dye solution which does not bleach in a high power laser beam.

It is a further object to provide a high absorption content at a wavelength of 1.06 microns so that the apodizer may be used with Nd+++ glass lasers.

It is a further object to provide a liquid absorber which can be index matched to a standard optical window material such as fused quartz which will withstand high power laser beams.

It is a further general object to provide a non-bleachable liquid absorber which is stable under high power radiation in dye cells and which will not change its absorption constant and which will not precipitate or otherwise deteriorate when used in high power dye cells.

Other objects and features of the invention will be apparent in the following description and claims in which the principles of operation are set forth together with the best mode presently contemplated for the practice of the invention.

A DRAWING accompanies the disclosure and the one view thereof is a cross-sectional view of a dye cell used for apodizing laser beams.

The cell is illustrated in the drawing as composed primarily of a metal ring 10 which has an annular inward projection 12 which terminates inside the ends of the ring at opposed shoulders 14 and 16. A radial port 18 is provided opening onto the surface of the projection 12 and leading to an enlarged port 20 which can be closed by a suitable sealing plug 22. At one end of the ring 10 is a plain optical element 24 formed of fused quartz and the like and sealed against the shoulder 14 by an O-ring 26. At the other end of the opening in the ring 10 is a shaped optical element 30 which has a cylindrical portion 32 with an annular radial surface which seals against an O-ring 34 and a second portion 36 which is shaped so that it curves downwardly and toward the optical element 24 having an interface relationship at 38. This provides an annular chamber 40 between the two transparent windows 24 and 30 which is shaped to provide a space for the desired amount of attenuating dye solution in the desired portions of the beam. This is for the purpose of eliminating diffraction rings from an aperture in a laser beam by providing a gradually increasing attenuation near the edge of the beam.

It will be appreciated that if the laser beam is not to be optically distorted, the dye solution retained in the annular chamber 40 must have the same index of refraction as the windows. For example, copper sulfate in water has been used in dye cells to attenuate laser beams, but there is no suitable window material which will index-match with the water solution. Similarly, attempts to match quartz windows with a mixture of $DmSO:H_2O$ and benzyl alcohol in water resulted in unstable solutions that precipitated a copper salt.

Neodymium glass is quite frequently used with high power laser systems. This emits radiation at 1.06 microns in the infrared portion of the spectrum not visible to the human eye. Thus, it is desirable to obtain a liquid for use in an apodizer which will be compatible with the wavelength of the glass used and which will assist in shaping of the laser beam to minimize the diffraction-induced self-focusing effect. The liquid must be stable in the presence of the laser beam so that it is not affected by the electronic transitions that occur during absorption of photons. The transmission must not increase as the power goes up.

It has been discovered that a satisfactory dye solution can be formed from copper nitrate, $Cu(NO_3)_2$, in dimethyl sulfoxide and water, $(CH_3)_2SO:H_2O$. The relative quantities of the dimethyl sulfoxide in water can be readily adjusted to index-match fused quartz apodizer windows at 1.06 micrometer wavelengths for nearly any operating temperature. This adjustment is accomplished by the relative concentration and it has been found that the following solution is a satisfactory index-match near room temperature ($\approx 30°$ C.):

Solvent: 6.2 parts dimethyl sulfoxide to 1 part $H_2O$ by volume

Concentrate: (with absorption constant at 50 nepers per cm)

dimethyl sulfoxide — 1000 cc
$H_2O$ — 476 cc
$Cu(NO_3)_2$ — 38.4 g

Since the refracted index of the dye solution changes faster with temperature than that of the fused quartz which is used as the windows, the apodizing dye requires temperature control.

We claim:

1. A dye cell for apodizing laser beams which comprises:
   a. a supporting ring having an opening,
   b. a pair of windows in said ring shaped to provide an annular chamber therebetween at the periphery of the opening in said ring,
   c. means to seal said chamber to retain liquid, and
   d. a solution in said chamber comprising copper nitrate in dimethyl sulfoxide and water mixed in such proportions that said solution has the same index of refraction as said windows at the operating temperature of said dye cell.

2. A dye cell as defined in claim 1 in which the solution has the following characteristics:

Solvent: 6.2 parts dimethyl sulfoxide to 1 part $H_2O$ by volume

Concentrate: (with absorption constant at 50 nepers per cm.)

Dimethyl sulfoxide — 1000 c.c.
$H_2O$ — 476 c.c.
$Cu(NO_3)_2$ — 38.4 grams.

* * * * *